Figure 5:

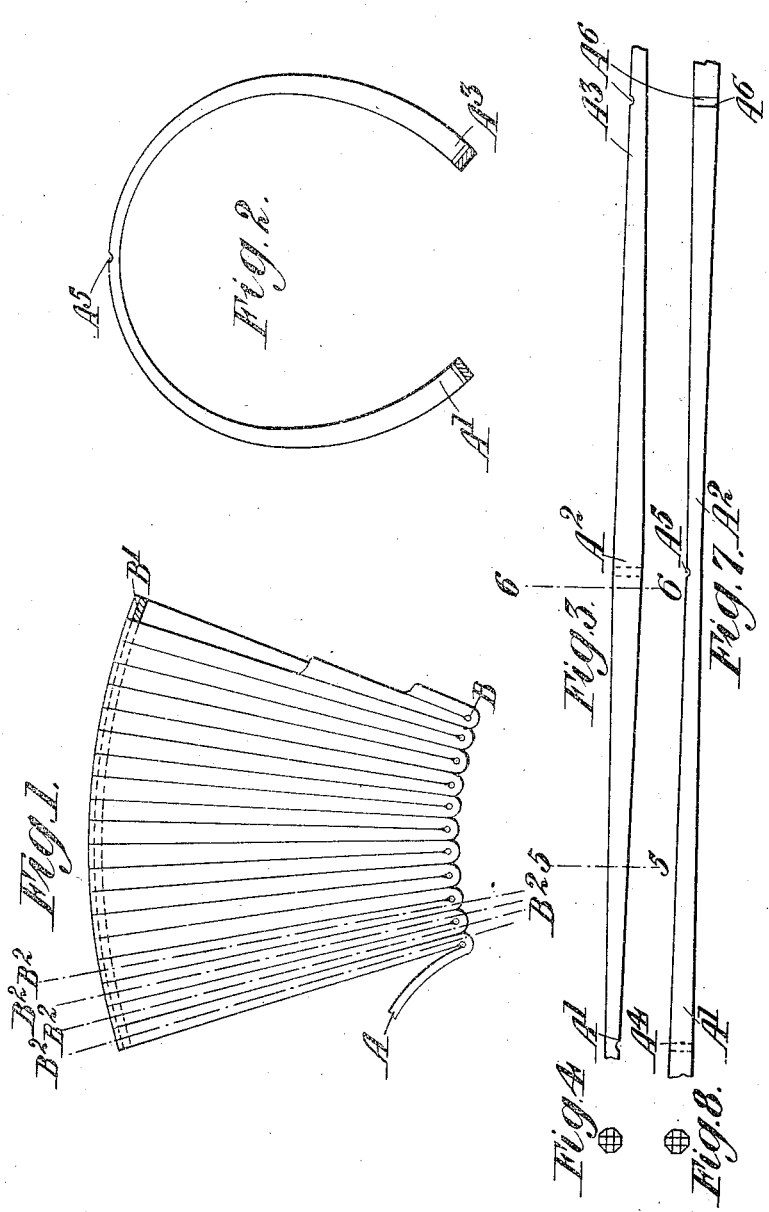

T. SLOPER.
MANUFACTURE OF CORD FABRICS.
APPLICATION FILED JAN. 28, 1910.

993,465.

Patented May 30, 1911.
3 SHEETS—SHEET 2.

Witnesses:
G. P. Kramer
Milton Ottenberg

Inventor:
Thomas Sloper
by Foster Freeman Watson + ?
Attys

T. SLOPER.
MANUFACTURE OF CORD FABRICS.
APPLICATION FILED JAN. 28, 1910.
993,465.
Patented May 30, 1911.
3 SHEETS—SHEET 3.
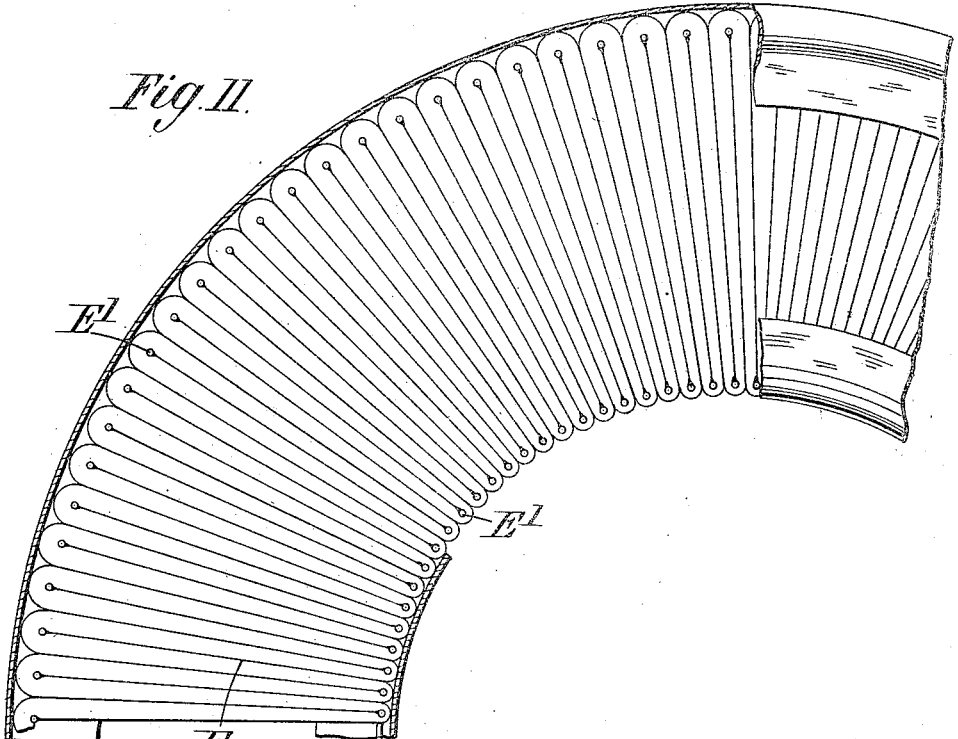
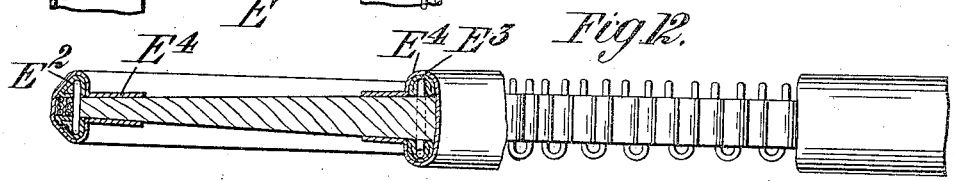
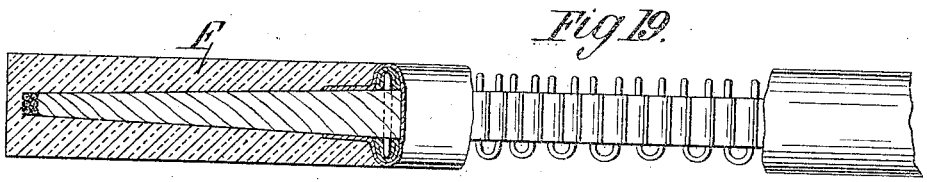
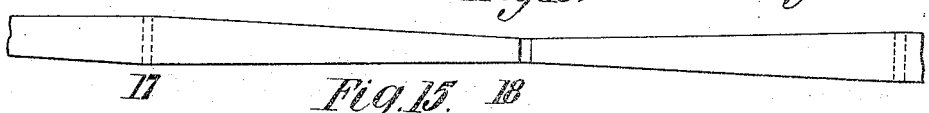

UNITED STATES PATENT OFFICE.

THOMAS SLOPER, OF DEVIZES, ENGLAND.

MANUFACTURE OF CORD FABRICS.

993,465.
Specification of Letters Patent.
Patented May 30, 1911.

Application filed January 28, 1910. Serial No. 540,612.

*To all whom it may concern:*

Be it known that I, THOMAS SLOPER, a subject of the King of England, residing at Devizes, in Wiltshire, England, have invented certain new and useful Improvements in the Manufacture of Cord Fabrics, of which the following is a specification.

This invention is for improvements in or relating to the manufacture of cord fabrics and mechanism therefor and has particular reference to the manufacture of rubbered cord fabrics for pneumatic tires and other purposes.

I have before manufactured a tire fabric that is built up from a continuous cord whose cross-section has a major and a minor axis, the cord being doubled backward and forward on itself, so that its different portions lie side by side. The cord portions were carried transversely across the tire and it will be seen that in making a curved fabric of this kind that is curved in two directions and wherein the cords traverse the line of curve the cords will be overcrowded at the inner edge of the tire which affords a smaller circumference, or will gape apart at the larger circumference or tread-portion, as the central axes of the cords must be closer together at the edges than at the tread or center of the fabric. To overcome this difficulty the special cord referred to above was adopted in order that the cord could be laid at the edge of the tire with its minor axis parallel with the face of the fabric and then turned at the tread so that its major axis was brought parallel with the face of the fabric. Although this arrangement gives satisfactory results it has been found in practice that in the manufacture of some sizes of tires the adjacent cords at the tread portion necessarily overlap so that a stepped surface similar to that produced by the overlapping of tiles on a roof is presented instead of an even surface. I have also before proposed that alternatively the cord may be of varying diameters, the thin part coming in the long cord at certain specified intervals, and the thick part also at certain specified intervals. It is however difficult to produce a cord of varying diameters as this necessitates the employment of a varying number of strands for different parts of the cord to increase or reduce the size of such parts according to the positions they are intended to occupy in the fabric.

It will be seen that in producing a fabric that is curved in the manner of a tire the cord portions lying side by side in the fabric must have their central axes at varying distances apart and yet each cord portion should lie close to its neighbor throughout its length and flush with the same, so that a closed even surface is provided without crowding or gaping of the cords. According to the present invention this result is obtained by the employment of a cord made of uniform diameter throughout but whose cross-sectional shape is afterward varied according to the distances at which the central axes of the different portions are to be situated from each other, when in position in the fabric. Thus, for instance, a cord may be employed whose cross-section at that portion which is to lie at the edge of the tire has a major and minor axis, the minor axis being intended to be disposed parallel to the face of the fabric, but at a point farther along the same cord may be approximately square in cross-section, and at a point, say sufficiently far along to lie at the tread, the shape in cross-section may be the same as that at the edge, but although the cord has not been twisted the major axis may now lie parallel to the face of the fabric. From this it will be seen that the variations of the cross-sectional shape of the cord may be so calculated for any given form of fabric that when in place the different cord portions lie side by side flush with each other and close to each other throughout their length so that a smooth and closed surface is presented.

Figure 6:
Figure 10:
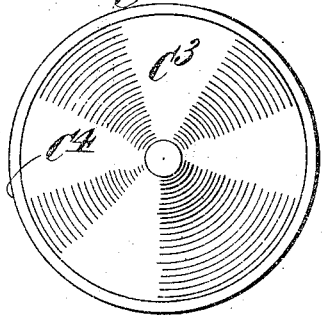
Figure 9:
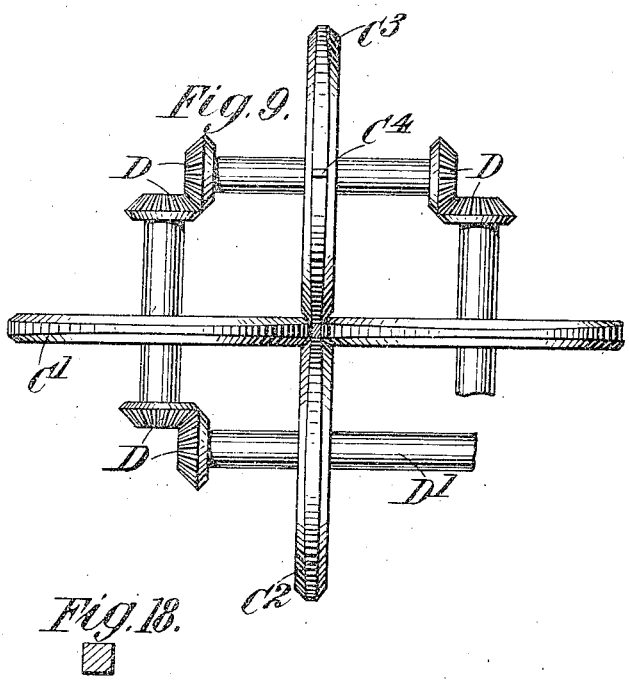
Figure 17:
Figure 18:

In the accompanying drawings:—Figure 1 is a side elevation of a portion of tire fabric made up of a cord constructed according to this invention, Fig. 2 is an end elevation of the same, Fig. 3 shows a length of cord viewed from one side, Fig. 4 is an elevation of the left hand end of the cord, Fig. 5 is a section on the line 5—5 of Fig. 3, Fig. 6 is a section on the line 6—6 of Fig. 3, Fig. 7 shows the length of cord illustrated in Fig. 3 turned over a quarter of a revolution so that a face is presented which is at right angles to that presented in Fig. 3, Fig. 8 is an elevation of the left hand end of the cord shown in Fig. 7, Fig. 9 is a diagrammatic view in plan of a machine for manufacturing the cord, Fig. 10 is a side elevation of one of the rollers shown in Fig. 8, Fig. 11 is a plan of a pump disk or ring built of cord constructed according to this invention, Fig. 12 shows a section through the ring, Fig. 13 shows a length of cord shaped for building this ring, Fig. 14 is an elevation of the right hand end of the cord shown in Fig. 13, Fig. 15 shows the same length of cord turned through 90° so that a face is presented which is at right angles to that shown in Fig. 13, Fig. 16 is an elevation of the right hand end of the cord shown in Fig. 15, Fig. 17 is a section on the line 17—17 of Fig. 15, Fig. 18 is a section on the line 18—18 of Fig. 15, and Fig. 19 is a section through a modified form of the ring shown in Fig. 11.

Like letters indicate like parts throughout the drawings.

It will be seen that the laps of the cord A, Fig. 1, although extending from a circle B of smaller diameter to a circle B' of larger diameter lie close together throughout the whole of the area covered by them and present a comparatively smooth surface. The central axes $B^2$ of the various laps of cord lie at varying distances apart, that is to say, the axes $B^2$ of the two laps near the line B are closer together than the axes $B^2$ of the same two laps near the line B', yet each cord portion lies close to its neighbor throughout its length and is flush with the same so that a close even surface is provided without crowding or gaping.

The fabric shown in Figs. 1 and 2 is intended for a tire and the cord used for constructing it has that face which is outwardly directed made narrow at A' where it passes around the pins or staples at the line B for securing it to the "former" or other support; the use of "formers" and pins when building up a fabric from cord is well known. The same face at the tread portion of the cover is made broad, as shown at $A^2$, and this again tapers down toward the part $A^3$ where it is the same width as the part $A^2$ and passes around the pins for securing the opposite side of the cover. The same cord viewed on the side that abuts against the neighboring lap of cord is broadest at A' as shown in Fig. 7 and narrowest at $A^2$ broadening out again at $A^3$. At a point intermediate of the parts A' and $A^2$ the cross-sectional area is approximately square as shown in Fig. 5 and at $A^2$ it is oblong as shown in Fig. 6.

The cord is indented or notched as at $A^4$, $A^5$, $A^6$ the notches $A^4$ and $A^6$ being employed to locate the cord relatively to the pins around which it is bent; the notches $A^5$ should lie at the center of the tread and assist the operator to aline the various laps as they are built into the cover. The marking may be used on cords that have no variations in shape to insure that each lap of cord shall be of the same length and under the same tension; also where depressions or recesses are used as marks they aid the binding of the cord around the staples or pins on the "former".

Any convenient apparatus may be employed for manufacturing this cord one form of machine being illustrated by way of example in Fig. 9. The cord may be of the well known kind usually employed by me for making tires and comprising a number of threads twisted or cabled together the whole being impregnated with rubber. Conveniently it is in the first instance of circular cross-section and is of the same diameter throughout. To give it the shape shown in Figs. 3–7 it is passed between eccentric rollers C, C', $C^2$, $C^3$. These rollers are connected together by bevel-wheels D and one of the bevel-wheels with its roller is carried on a driven shaft D' whereby movement is transmitted to all the rollers. It will be seen that by properly shaping the eccentric rollers and making them of suitable diameter the opposite faces of the cord may be made to narrow and expand at any required interval, the rollers being always so adjusted that the cross-sectional area of the cord is maintained practically constant and the threads whereof it is composed unbroken.

To indent the cord, one or more of the rollers may be provided with a projection $C^4$, shown in elevation in Fig. 10, so that at each revolution of the roller a depression will be made in that face of the cord which the roller bears against and as the cord is fed evenly through the rollers these depressions will be equi-distant.

It is important to maintain the cord at constant cross-sectional area throughout so that the tensile strength of the cord may be the same at all parts. In a cord constructed with varying diameters, the tensile strength of the thick parts of the cord is greater than that of the thin. Moreover, a tire fabric produced by a cord constructed according to the present invention is thinner at the tread than at the edges, whereas, that produced by the cord of varying diameters is thicker at the tread than at the edges.

In the case of the cord of varying diameters nothing is gained by the greater strength of the fabric at those points where the cord portions of larger diameter are situated as the ultimate strength of the cord is necessarily only that of the strength of those parts which are of smallest diameter. Further, it is found in practice to be advantageous to employ as thin a fabric as possible in pneumatic tires and this especially applies to the tread portion where constant bending takes place when in use; by the employment of a cord which is of approximately uniform cross-section throughout, but of varying shape, it is possible to produce a fabric which is of greater uniformity and thinner at the tread than at its edges.

Where a machine is employed for building the cord into fabric, the rollers shown in Figs. 9 and 10 or other mechanism for shaping the cord may be geared to the machine so that these two mechanisms coöperate automatically.

Obviously the invention is not restricted to the variation in shape of cord, shown in Figs. 3–7, as for different purposes the shape may be differently varied, and instead of an oblong or square cross-section being maintained throughout, an approximately V- or wedge-shaped cross-section may obtain in some parts of, or throughout the whole length of, the cord as will be readily understood.

The cord according to this invention is not restricted for use in building tire fabrics only. In Figs. 11 and 12 it is shown as applied to a pump disk or ring. In this case the cord E is bent backward and forward over staples E' that may be carried by a suitable "former" as is usual in building a tire fabric, but the cords in this case all lie in the same plane the working face of the "former" being flat instead of curved. For building a ring such as is shown in Figs. 11 and 12 a cord having the shapes shown in Figs. 13–18 is employed. After the cord has been placed beads E² E³ of canvas or other material such as is commonly used for building tires may be built over the outer and inner edges of the ring and the beads and a part of the cords may be finally covered with canvas as at E⁴. The same kind of material may be employed as a reinforcement for rubber or other bodies. In Fig. 19 a ring constructed in the same manner as that shown in Figs. 11 and 12 is used to reinforce a rubber ring whereof the rubber is shown at F. The cords are embedded in the mass of rubber F. These rings are only shown by way of example to illustrate that the cord according to this invention can be employed to manufacture goods of various shapes.

What I claim as my invention and desire to secure by Letters Patent is:—

1. The herein described cord for use in manufacturing a fabric wherein portions of a continuous cord are placed side by side with their central axes in non-parallel relation, said cord having the same cross sectional area throughout its length, while the cross-sectional form thereof is varied in conformity to the variations in the distances separating the central axes of contiguous sections of the cord in the fabric, the variations in the cross sectional form being produced by submitting the cord to pressure prior to laying it.

2. The herein described cord for use in manufacturing a fabric wherein portions of a continuous cord are placed side by side with their central axes in non-parallel relation, the cross-sectional form of the cord varying at predetermined intervals throughout its length in conformity to the variations in the distances separating the central axes of contiguous sections of the cord in the fabric, the variations in the cross sectional form being produced by submitting the cord to pressure prior to laying it.

3. The herein described cord for use in manufacturing a fabric wherein portions of a continuous cord are placed side by side with their central axes in non-parallel relation, the cross-sectional form of the cord varying at predetermined intervals, throughout its length in conformity to the variations in the distances separating the central axes of contiguous sections of the cord in the fabric, and said cord having suitable exterior indications of such variation in cross-sectional form, the variations in the cross sectional form being produced by submitting the cord to pressure prior to laying it.

4. The herein described cord for use in manufacturing a fabric wherein portions of a continuous cord are placed side by side with their central axes in non-parallel relation, said cord comprising a series of similar sections, the cross-sectional form of the cord in each section varying at different points in conformity to the variations in the distances separating the central axes of contiguous sections of the cord in the fabric, the variations in the cross sectional form being produced by submitting the cord to pressure prior to laying it.

5. The herein described fabric including a continuous cord bent to provide a series of sections arranged side by side with the central axes of adjoining sections in non-parallel relation, said cord being of the same cross-sectional area throughout its length while having its cross-sectional form varied in conformity with the variations in the distances separating the central axes of contiguous sections thereof in the fabric, the variations in the cross sectional form being produced by submitting the cord to pressure prior to laying it.

6. In the manufacture of a cord fabric wherein portions of a continuous cord are laid side by side with their central axes at varying distances apart a process of building the fabric consisting in subjecting a cord whose shape is in the first instance uniform throughout to pressure so applied as to give to the cord a cross-sectional shape that varies throughout according to the distances at which the central axes of the different portions are to be situated from each other and then laying the cord-portions so shaped side by side and securing them together.

7. In the manufacture of a cord fabric wherein portions of a continuous cord are laid side by side with their central axes at varying distances apart, a process of building up the fabric consisting in subjecting a cord, whose shape is in the first instance uniform throughout, to pressure, so applied as to give to the cord a cross-sectional shape that varies throughout according to the distances at which the central axes of the different portions are to be situated from each other while retaining the cross-sectional area of the cord constant, and then laying the shaped cord portions side by side and securing them together.

8. In the manufacture of a cord fabric wherein portions of a continuous cord are laid side by side with their central axes at varying distances apart, a process of building up the fabric consisting in subjecting a cord, whose shape is in the first instance uniform throughout, to pressure, so applied as to give to the cord a cross-sectional shape that varies throughout according to the distances at which the central axes of the different portions are to be situated from each other while retaining the cross-sectional area of the cord constant, indenting the cord when giving it its varied cross-sectional shape so that those parts which are to occupy given portions in the fabric are indicated and adapted to bend more easily than the non-indented parts and then laying such indented portions side by side and securing them together.

In testimony whereof I have signed my name to this specification in the presence of two subscribing witnesses.

THOMAS SLOPER.

Witnesses:
H. D. JAMESON,
T. L. RAND.